United States Patent
Lecue et al.

(10) Patent No.: US 9,679,248 B2
(45) Date of Patent: Jun. 13, 2017

(54) AUTOMATED CREATION OF SEMANTICALLY-ENRICHED DIAGNOSIS MODELS USING TIME SERIES DATA OF TEMPERATURES COLLECTED BY A NETWORK OF SENSORS

(71) Applicant: INTERNATIONAL BUSINESS MACHINES CORPORATION, Armonk, NY (US)

(72) Inventors: Freddy Lecue, Dublin (IE); Joern Ploennigs, Dublin (IE); Anika Schumann, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 14/143,840

(22) Filed: Dec. 30, 2013

(65) Prior Publication Data

US 2015/0186777 A1    Jul. 2, 2015

(51) Int. Cl.
| | | |
|---|---|---|
| G06F 15/18 | (2006.01) | |
| G06N 5/02 | (2006.01) | |
| G06F 17/30 | (2006.01) | |

(52) U.S. Cl.
CPC ....... *G06N 5/025* (2013.01); *G06F 17/30734* (2013.01)

(58) Field of Classification Search
CPC .............................................. G06F 17/30734
USPC ............................................. 706/12, 45, 62
See application file for complete search history.

(56) References Cited

U.S. PATENT DOCUMENTS

| | | | |
|---|---|---|---|
| 6,550,024 B1 | 4/2003 | Paguerk et al. | |
| 8,266,186 B2 | 9/2012 | Dettinger et al. | |
| 2002/0019870 A1* | 2/2002 | Chirashnya | H04L 41/0681 709/224 |
| 2003/0040878 A1* | 2/2003 | Rasmussen | G01M 13/045 702/85 |
| 2007/0166707 A1* | 7/2007 | Schadt | C12Q 1/6827 435/6.11 |
| 2008/0294423 A1* | 11/2008 | Castellani | G06F 11/0733 704/4 |
| 2009/0083203 A1* | 3/2009 | Cho | G06F 15/16 706/21 |
| 2010/0324927 A1* | 12/2010 | Tinsley | G06F 19/322 705/2 |

(Continued)

OTHER PUBLICATIONS

Druzdzel et al., Qualitiative verbal explanations in Bayesian belief networks, 1996, AISB Quarterly (1996): 43-54.*

(Continued)

*Primary Examiner* — David Vincent
(74) *Attorney, Agent, or Firm* — Scully, Scott, Murphy & Presser, P.C.; Kurt P. Goudy, Esq.

(57) ABSTRACT

A system, method and a computer program product may be provided for automatically creating and parameterizing a semantically-enriched diagnosis model for an entity. The system receives a list of data points, from sensors or a database, to be used to create a diagnosis model. The system automatically creates the diagnosis model based on the received list of data points and data stored in a database and parameterizes the diagnosis model. The parameterized diagnosis model reflects rules that determine one or more potential causes of one or more abnormalities of one or more physical conditions in the entity.

27 Claims, 7 Drawing Sheets

(56) References Cited

U.S. PATENT DOCUMENTS

| | | | | |
|---|---|---|---|---|
| 2011/0155462 A1* | 6/2011 | Du Castel | ............. | G06N 5/022 175/24 |
| 2011/0295790 A1* | 12/2011 | Zillner | ................... | G06N 5/02 706/55 |
| 2012/0145152 A1* | 6/2012 | Lain | ................. | A61M 16/0051 128/204.23 |
| 2013/0096892 A1* | 4/2013 | Essa | ....................... | G09B 7/00 703/2 |
| 2013/0310653 A1* | 11/2013 | Zillner | ................ | G06F 19/345 600/300 |

OTHER PUBLICATIONS

Sheppard, JW. et al.; "Standard diagnostic services for the ATS framework"; Proceedings of the 2009 IEEE AUTOTESTCON. Systems Readiness Technology Conference "Mission Assurance Through Advanced ATE", pp. 393-400; Sep. 14-17, 2009.

SPI DST et al.; "Specifying a Semantically Adequate Structure for Information Systems and Databases"; An IP.com Prior Art Database Technical Disclosure; http://ip.com/IPCOM/000161232D; Dec. 9, 2007.

Hastie, Trevor, and Robert Tibshirani. "Generalized additive models." Statistical science, Technical Report No. 2, Sep. 1984, pp. 1-39.

SPARQL 1.1 Update W3C Recommendation Mar. 21, 2013, W3C (MIT, ERCIM, Keio, Beihang), Mar. 30, 2013, http://web.archive.org/web/20130330075313/http://www.w3.org/TR/sparql11-update/.

Russell et al., Data-Driven Methods for Fault Detection and Diagnosis in Chemical Processes, Springer Verlag, 2000, book—Product Flyer.

D'Elia et al., "Smart applications for the maintenance of large buildings: How to achieve ontology-based interoperability at the information level," in ISCC—IEEE Symp. on Comp. and Communications, Jun. 22-25, 2010, pp. 1-6.

Fischer et al., "Semantic data integration and monitoring in the railway domain," IRI—IEEE Int. Conf. on Information Reuse Integration, Jul. 10-12, 2009, pp. 11-16.

Brady et al., Configuring Building Energy Management Systems using Knowledge encoded in Building Management System points lists, U.S. Appl. No. 13/711,012, filed Dec. 11, 2012.

Kukal et al., "From Symptons to Faults: Temporal Reasoning Methods," 2009 International Conference on Adaptive and Intelligent Systems, Sep. 24-26, 2009, pp. 155-159.

\* cited by examiner

AUTOMATED CREATION OF SEMANTICALLY-ENRICHED DIAGNOSIS MODELS USING TIME SERIES DATA OF TEMPERATURES COLLECTED BY A NETWORK OF SENSORS

BACKGROUND

This disclosure is generally related to creating a diagnosis model and to parameterizing a diagnosis model.

BACKGROUND OF THE INVENTION

Diagnostics methods have been studied in the area of mechanics, controlling systems, medical domains, and Artificial Intelligence, etc. A diagnostics method may include a plurality of evaluations and tests. For example, a diagnostic method is used to detect a medical disease and a medical condition. Based on the detected condition, users may apply one or more methodology to improve a current condition.

SUMMARY

A computing system, a method and a computer program product may be provided for automatically deriving a semantically enriched diagnosis model from a list of data points. The computing system receives a list of data points, from sensors or a database or a knowledge base to be used to create a diagnosis model. The computing system automatically creates the diagnosis model based on the received list of data points and data from additional knowledge base. The automatically created diagnosis model describes rules that associates one or more potential causes with one or more abnormalities of one or more conditions in a system. The computing system parameterizes the diagnosis model by running a statistical or data mining technique over historical or real-time time series data of the received data points and the data in the knowledge base(s).

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 7:
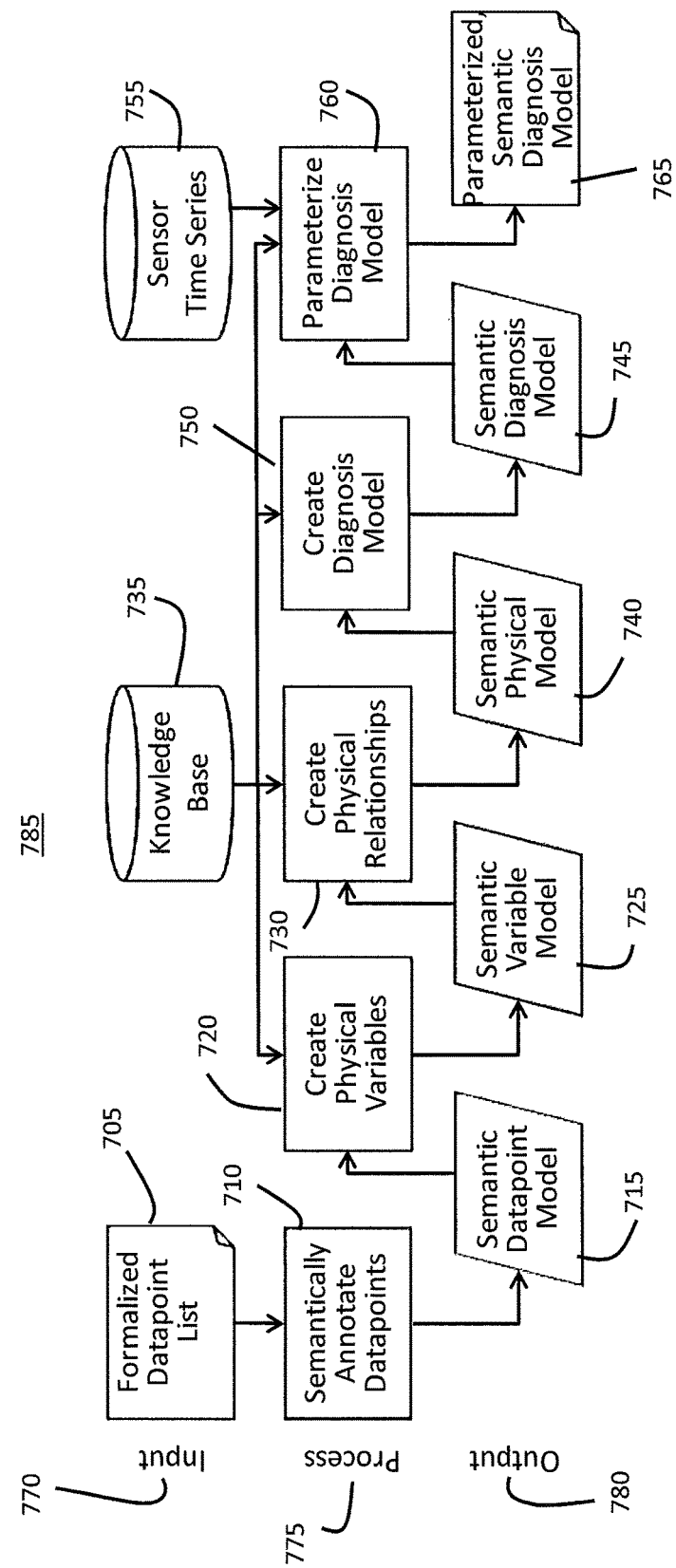
FIG. 7 illustrates a flowchart that describes method steps automatically parameterizing a semantically enriched diagnosis model from time series data received from a sensor network in one embodiment.

FIG. 7 illustrates a flowchart that describes method steps for generating a parameterized semantic diagnosis model. A first row 770 in a diagram 785 represents the inputs. A middle row 775 represents process steps depicted in FIGS. 1-2 described below. A bottom row 780 presents models resulting from each processing step. Each output model, e.g., semantic datapoint model 715, semantic variable model 725, etc., also includes information included in a preceding output model. The parameterized semantic diagnosis model 765 is any combination of all the output models: models 715, 725, 740 and 745. For example, the parameterized semantic diagnosis model 765 may include all the mathematical terms of all the output models. The individual steps and output models are described as follows: at 705, a computing system retrieves data points list from a database or sensors. The data points include, but are not limited to: numerical or characteristic data that represents historical or real-time temperatures of a particular location, numerical or characteristic data that represent historical or real-time number of occupants in the same particular location, etc. The database may further store a plurality of pre-determined semantic concepts and rules.

Figure 6:
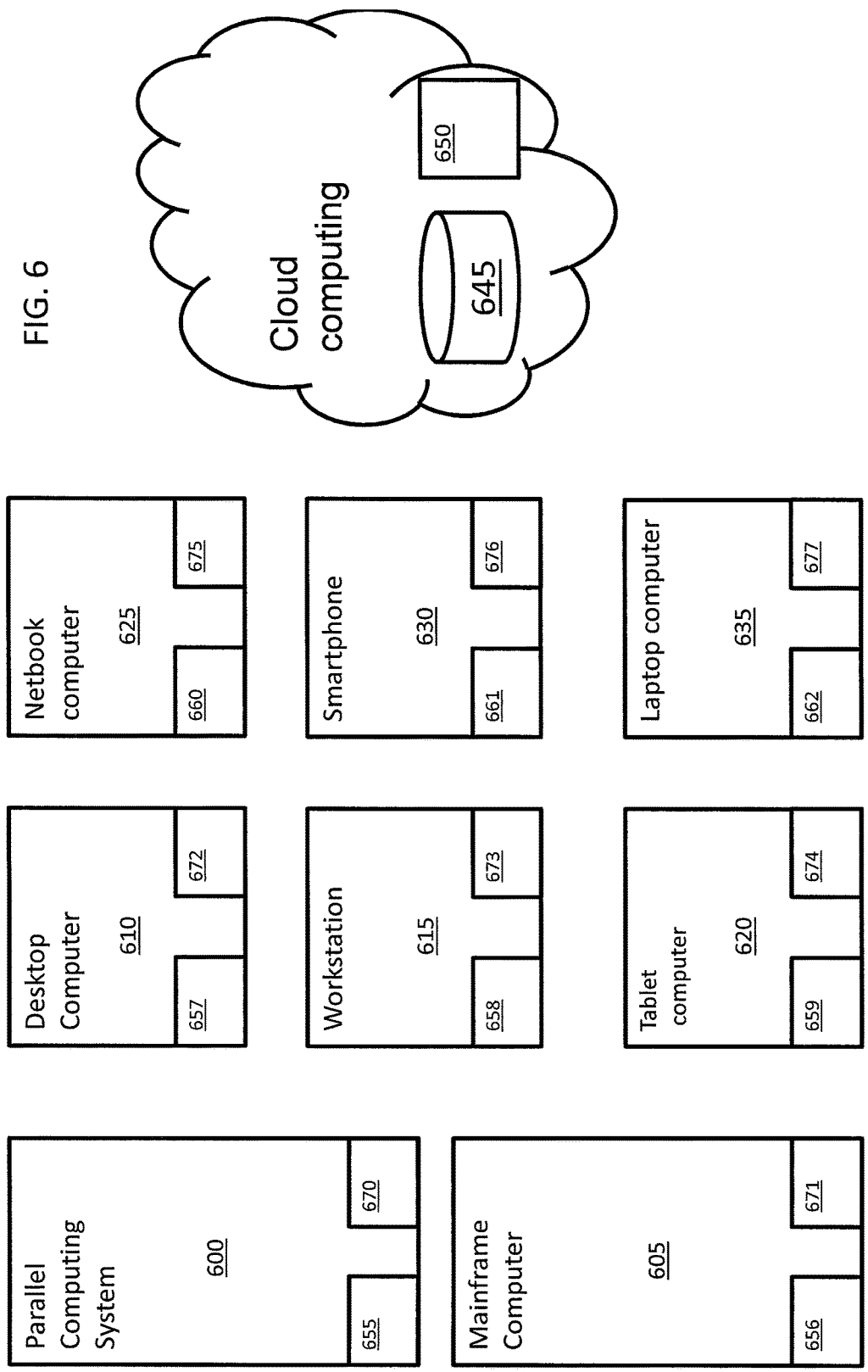
FIG. 6 illustrates exemplary computing systems in one embodiment.

FIG. 6 illustrates examples of the computing system. An example computing system may include, but are not limited to: a parallel computing system 600 including at least one processor 655 and at least one memory device 670, a mainframe computer 605 including at least one processor 656 and at least one memory device 671, a desktop computer 610 including at least one processor 657 and at least one memory device 672, a workstation 615 including at least one processor 658 and at least one memory device 673, a tablet computer 620 including at least one processor 656 and at least one memory device 674, a netbook computer 625 including at least one processor 660 and at least one memory device 675, a smartphone 630 including at least one processor 661 and at least one memory device 676, a laptop computer 635 including at least one processor 662 and at least one memory device 677, or a cloud computing system 640 including at least one storage device 645 and at least one server device 650.

Returning to FIG. 7, at 710, the computing system semantically annotates data points, e.g., by classifying the data points into semantic categories that provide a meaning to each data point. The computing system outputs the semantic data point model 715 which is a set of semantically annotated data points. At 720, the computing system creates variables that represent physical condition(s) indicated by the semantically annotated data points. At 725, the computing system generates a semantic variable model. For example, the semantic variable model may be a data representation, e.g., a graph of the created variables. At 730, the computing system identifies a relationship of the variables. At 740, the computing system creates a semantic physical model represented by the identified relationship. At 750, based on the created semantic physical model, the computing system creates a diagnosis model 745 which may be used to diagnose (i.e., detect) one or more potential (or actual) causes of the physical condition(s), e.g., by solving the diagnosis model. At 760, the computing system parameterizes the diagnosis model, e.g., by analyzing historical or real-time time series data 755 of the data points by running a statistical or data mining technique on the received data points and data in the knowledge base.

In one embodiment, the computing system utilizes data accessible and/or retrievable from knowledge base and the data points retrieved from a database or received from a sensor network in order to automatically derive a semantically-enriched diagnosis model, i.e., the parameterized semantic diagnosis model 765. The parameterized diagnosis model 765 maps one or more potential causes or actual causes to a condition of a system (i.e., an entity) and enables, based on the mapping, a user or the computing system to identify the one or more potential causes or the actual causes of an abnormal condition of the entity. An entity includes, but is not limited to: a building, a water network, a smart grid, a traffic sensor network, etc.

Figure 3:
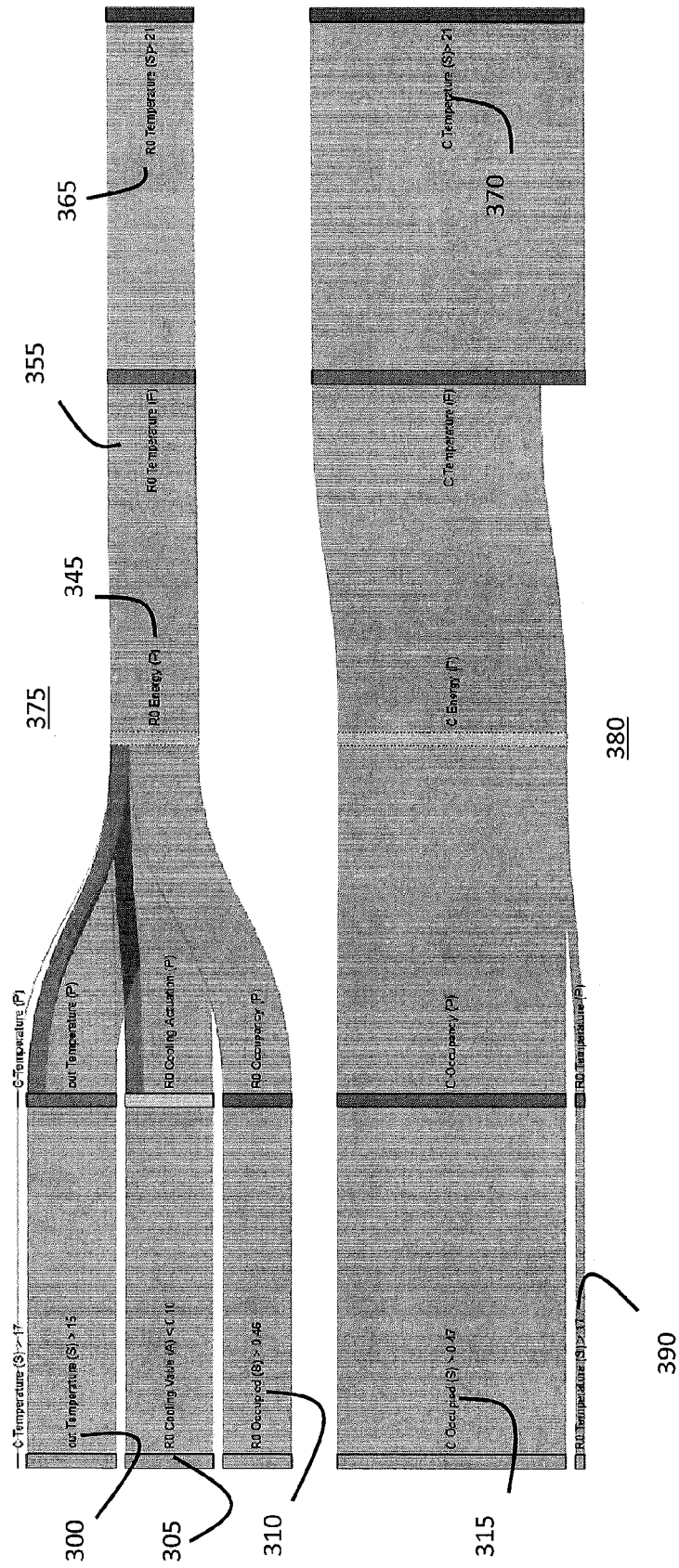
FIG. 3 illustrates an output of applying a parameterized diagnosis model in one embodiment.

For example, an outcome of solving the parameterized diagnosis model 765 may result in a graph (for example, a graph 375 FIG. 3) that associates potential causes to abnormality of physical conditions in an entity (i.e., a system). In FIG. 3, an external temperature 300 (e.g., higher than 15° F.), a cooling valve 305 set to a particular control value and the number of users 310 in a room may affect a current room temperature of the room 355 and energy 345 consumed to control the current room temperature. Based on this graph 375 derived by solving the parameterized diagnosis model 765, the computing system may determine that a particular room temperature 365, which is higher than a threshold, may be caused by one or more of: the external temperature 300, the cooling valve 305 and/or the number of users 310 in the room. In another example, a graph 380 derived by solving the parameterized diagnosis model describes that a current occupancy of a room 315 and a current room temperature 390 may be a cause of an abnormal current temperature of a particular place 370, which is higher than a threshold. In one embodiment, the parameterized diagnosis model may be a mathematical formula (not shown) whose components are the created variables. In another embodiment, the parameterized diagnosis model may be a graph (not shown) whose nodes are the created variables and whose edges are the identified relationships.

For example, these edges may include positive or negative weights, e.g., positive or negative correlation coefficient values between values of two connection nodes (i.e., variables). The computing system or the user creates the graph, e.g., by using SPARQL/Update programming language. By using a graph query feature and/or a filtering feature and/or a graph traversing feature embed in SPARQL/Update programming language, the computing system may be able to find a primary potential cause of an abnormal condition of an entity. For example, the computing system or the user may use the filtering feature to filter out one or more nodes whose weight is less than a threshold while traversing from a starting node (i.e., a node representing a physical condition of an entity) to a destination node (i.e., a node representing the abnormal condition). The computing system may concurrently traverse a variety of paths whose edges' weights are higher than the threshold. Final path(s), from the starting node to the destination node, which survive the filtering feature may include the primary potential cause. One or more of the node(s) in the final path(s) may be the primary potential cause(s) of the abnormal condition.

The semantically-enriched diagnostic model (i.e., the parameterized semantic diagnosis model 765) determines the potential causes of abnormal states of physical conditions of entities as described in the above examples. In one embodiment, the computing system employs processing steps of:
1. deriving a relationship between data points retrieved from a database or a sensor network or a knowledge base;
2. based on the created relationship, creating the semantically-enriched diagnosis model; and
3. analyzing the data points and their time series data to parameterize the diagnosis model.

In one embodiment, the computing system receives a data points list, e.g., from a database and/or a sensor network and/or a knowledge base, associated with an entity or another system. The computing system automatically adds semantic concepts to the data points list, e.g., by using a known classification technique. The semantic concepts add categorical information that is generic and static to each data point. For example, semantic concepts may include, but are not limited to: functionality represented by the data points (i.e., sensors, actuators, controllers, etc.), measurements represented by the data points (e.g., temperature, occupancy (number of users in a room)) or location information of the data point (e.g. a room at which one or more sensors are located). The computing system creates variables that represent conditions or characteristics of the entity that are detected by the sensors. The variables may also represent not monitored conditions or characteristics of the entity which are based on data retrieved from the knowledge base or the database. The computing system determines a relationship between these variables that reflect interactions between these variables, e.g., by reasoning correlation directions between these variables. For example, if a value of a correlation direction of a first variable and a second variable is positive, an increase of a value of the first variable may result in an increase of a value of the second variable. In another example, if a value of a correlation direction of a first variable and a second variable is negative, an increase of a value of the first variable may result in a decrease of a value of the second variable.

In one embodiment, based on the determined relationship, the computing system creates a semantically-enriched diagnostic model, e.g., by representing the determined relationships of variables in a graph. In this semantically-enriched diagnostic model, the semantic concepts associated to variables enable the computing system or a user to interpret the model (e.g. the user can identify that the potential cause 305 is a cooling valve in room R0). In another embodiment, the computing system parameterizes the diagnostic model 745, e.g., by using the semantic concepts added to the data points and a statistical analysis or data mining of historical or real-time time series data points. Parameters in the parameterized diagnosis model may be factors to determine the potential (or actual) causes of an abnormality of an entity. The computing system may determine values and/or functions of those parameters, e.g., by using a known parameter estimation technique using Generalized Additive Models.

Figure 4:
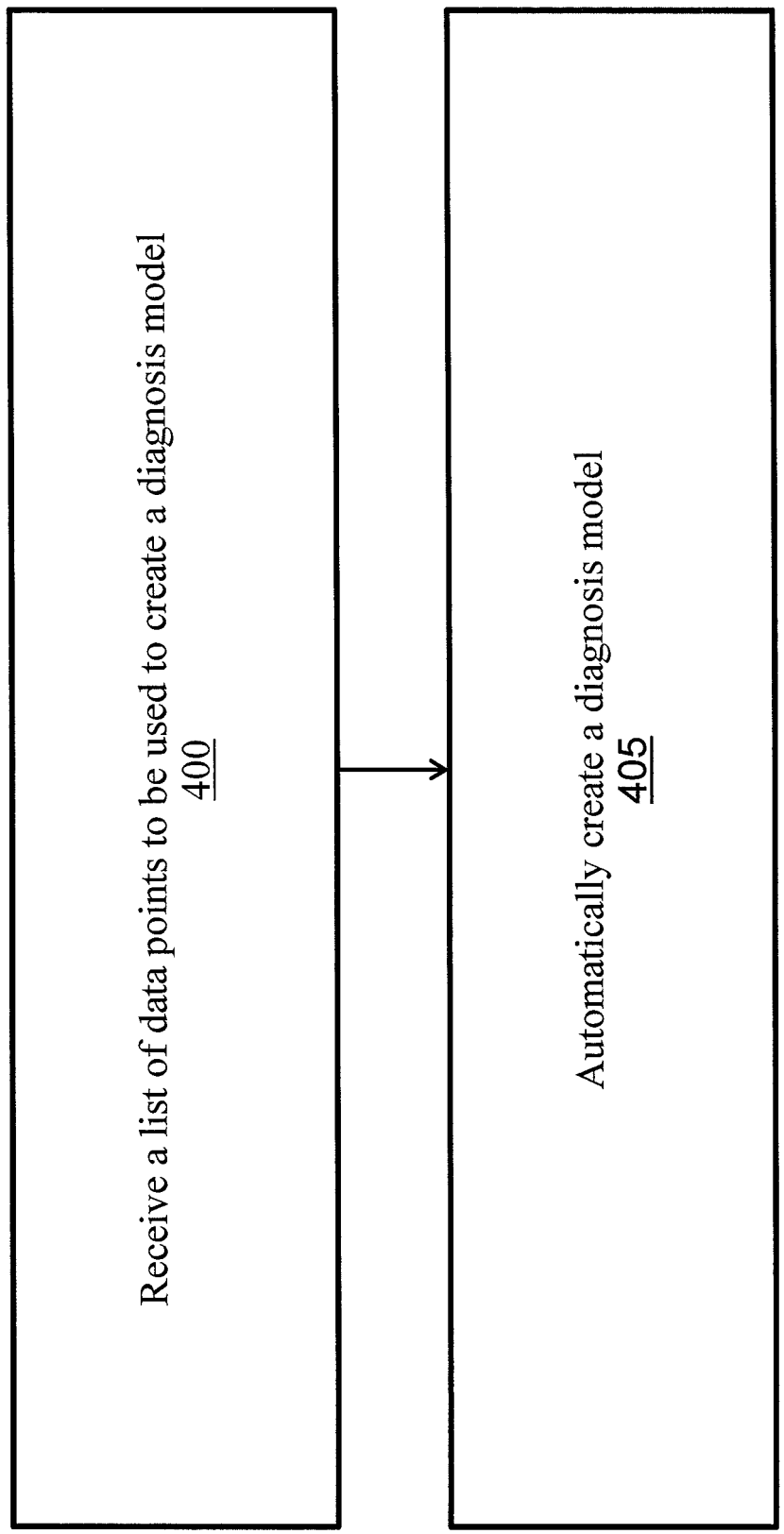
FIG. 4 illustrates a flowchart for automatically creating a diagnosis model in one embodiment.

FIG. 4 illustrates flowcharts for automatically deriving a semantically enriched diagnosis model from a list of data points. At 400, the computing system receives a list of data points, e.g. from a database or sensor network or knowledge base, to be used to create a diagnosis model. The computing system may semantically annotates the data points, e.g., by assigning semantic concepts to each data point. At 405, the computing system automatically creates the diagnosis model based on the semantically annotated data points, e.g., by identifying one or more relationships between the semantically annotated data points. The automatically created diagnosis model may determine rules that associate one or more potential causes with one or more abnormalities. In a further embodiment, the computing system may store data that represent potential relationships of the semantically annotated data points in a knowledge base.

Figure 5:
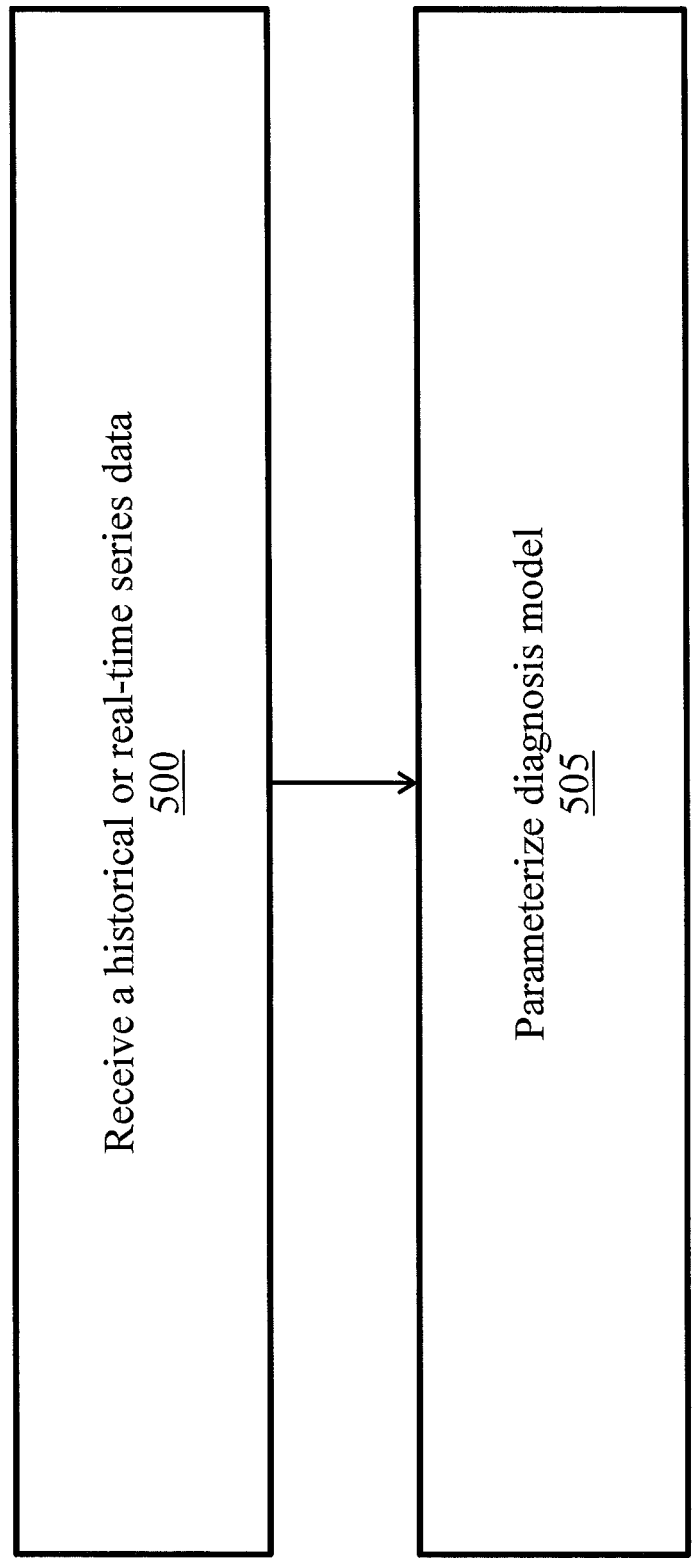
FIG. 5 illustrates a flowchart for automatically creating a parameterized diagnosis model in one embodiment.

In one embodiment, in FIG. 5, at 500, the computing system receives historical or real-time time series data points and analyzes the received data points to determine parameters of the diagnosis model 745, e.g., by using a known statistical or data mining technique or a known parameter estimation technique. At 505, by analyzing historical or real-time time series data points, the computing systems determines parameters of the diagnosis model and creates the parameterized semantic diagnosis model 765 that may enable the computing system or the user to identify a cause of an abnormality of a corresponding entity.

For examples, the computing system defines a room Room1 as an observed entity with a sensor data point TempSensor1 for the temperature and a sensor data point HeatingValve1 for a valve of a heating system. The computing system defines an abnormally high temperature, e.g., more than 120° F., by a state TempHigh1 that is observable in the time series sensor data TempSensor1.

The computing system automatically annotates semantic concepts to the data points list. Based on the semantic annotation of the data points, the system creates a semantic data point model that includes, for example:

Room1 instanceOf "room"; (Room1 is an instance of a semantic concept "room")

TempSensor1 instanceOf "temperature sensor"; (TempSensor1 is an instance of a semantic concept "temperature sensor".)

HeatingValve1 instanceOf "heating valve"; (HeatingValve1 is an instance of a semantic concept "heating valve".)

TempHigh1 instanceOf "abnormality"; (TempHigh1 is an instance of a semantic concept "abnormality".)

TempHigh1 instanceOf "high"; (TempHigh1 is an instance of a semantic concept "high.")

TempSensor1 forObject Room1; (TempSensor1 is associated with the object Room1.)

HeatingValve1 forObject Room1; (HeatingValve1 is associated with the object Room1.)

TempHigh1 isObservedBy TempSensor1; (TempHigh1 is observed by sensor data points TempSensor1.)

In one embodiment, a knowledge base stores metadata that describes which variables require semantic concepts in order to create the diagnosis model 745. The diagnosis model 745 may describe one or more rules that may be described, e.g., in a form of "FOREACH (concept pattern) CREATE (variable pattern)". For example, assume that an air temperature is a variable common to all rooms in the entity. In this example, a user may define an exemplary generic rule "FOREACH (R1 instanceOf "room") CREATE ((NewName instanceOf "temperature") AND (NewName forObject R1))". This exemplary rule describes that for each instance R1 (R1 is a placeholder) of the concept "room", the computing system creates new variables, e.g., an instance of a variable temperature with a name NewName (also a placeholder for a newly generated name), and assigns the temperature variable instance to the instance of the room. The room temperature may be detected by a sensor. A following rule associates the sensor with the newly created variable: "FOREACH ((TS1 instanceOf "temperature sensor") AND (T1 instanceOf "temperature") AND (TS1 forObject R1) AND (T1 forObject R1)) CREATE (T1 isMonitoredBy TS1)". The rule associates sensor(s) of a sensor type "temperature sensor" to a corresponding variable of a variable type "temperature" if those sensor(s) and the corresponding variable share a same object R1 which represents a room. These rules can be combined in one rule and the combined rule may include additional variables. For example, a heating system releases heat if the heating system is active and thus a user may store a following rule in a database: "FOREACH ((H1 instanceOf "heating valve") AND (R1 instanceOf "room") AND (H1 forObject R1)) CREATE ((NewName instanceOf "heat") AND (NewName isMonitoredBy H1) AND (NewName forObject R1))". According to this rule, the computing system creates a new instance of a variable "heat" for each instance H1 of a data point with a semantic type "heating valve" and associates a newly created instance variable "heat" to the data point instance H1 and an observed object R1. The computing system applies this rule to the semantic datapoint model, e.g., a semantic datapoint model 715 shown in FIG. 7, and then creates a semantic variable model, e.g., a semantic variable model 725 shown in FIG. 7, based on those rules and variables which include, but are not limited to:

Temperature1 instanceOf "temperature"; (Temperature1 is an instance of the semantic concept temperature.)

Temperature1 isMonitoredBy TempSens1; (values of the variable Temperature1 is recorded by the sensor data point TempSens1.)

Temperature1 forObject Room1; (the variable Temperature1 is associated with an object Room1.)

Heat1 instanceOf "heat"; (the variable Heat1 is an instance of the semantic concept "heat".)

Heat1 isMonitoredBy HeatingValve1; (the variable Heat1 is recorded by the data point HeatingValve1.)

Heat1 forObject Room1; (the variable Heat1 is associated with an object Room1.)

Variables represent physical interactions and physical conditions of the entity. For example, temperature in a room is influenced by the heating system. The user defines a rule and stores the rule in the database. One exemplary rule describes:

FOREACH ((T1 instanceOf "temperature") AND (H1 instanceOf "heat") AND (R1 instanceOf "room") AND (T1 forObject R1) AND (H1 forObject R1)) CREATE (T1 isPositivelyCorrelatatedTo R1). This rule is applied by automatically searching for a match between a value of a variable T1 that is an instance of the semantic concept "temperature" and a value of a variable H1 that is instance of concept "heat" assigned to an object R1 of an object type "room". For each match, a relationship between the temperature and the heat is created, for example, Temperature) is positively correlated to Heat1.

A relationship of variables represents an interaction of variables that associate potential causes to abnormalities determined based on the received data points. An abnormality is a specific state of an observed object, e.g., Room1, that can be detected within the real-time time-series data from sensors. An example of an abnormality includes, but is not limited to: a room temperature higher than a threshold, etc. For each instance of an abnormality, the computing system determines the potential causes of the abnormality using another example rule in the knowledge base in a form of: "FOREACH ((A1 instanceOf "abnormality") AND (A1 instanceOf "high") AND (A1 isObservedBy S1) AND (V1 isMonitoredBy S1) AND (V2 isPositivelyCorrelatatedTo V1) AND (V2 isMonitoredBy S2)) CREATE ((NewName instanceOf "cause") AND (NewName instanceOf "high") AND (NewName isObservedBy S2) AND (NewName isPotentialCauseOf A1))." This example rule searches for each instance (abnormal state) of the semantic concept "abnormality" and "high" that is observed by a data point S1 and that is monitored and recorded by values of variable V1. The computing system(s) searches for each variable V2 whose values are monitored and recorded by a second sensor S2 and which is positively correlated to V1. For each pair of V1 and V2, the computing system(s) creates a new state (named NewName) of a semantic type "cause" that is assigned to S2 and that is a potential cause of A1. This example rule further creates a new state HeatHigh1 as a potential cause of an abnormal state TempHigh1 of an observed object, for example, R1. A semantically-enriched diagnosis model, which includes the example rule, includes, but is not limited to:

HeatHigh1 instanceOf "cause"; (HeatHigh1 is an instance of a semantic concept "cause".)

HeatHigh1 instanceOf "high"; (HeatHigh1 is an instance of a semantic concept "high".)

HeatHigh1 isObservedBy HeatingValve1; (HeatHigh1 is observed by the data point HeatingValve1.)

HeatHigh1 isPotentialCauseOf TempHigh1; (HeatHigh1 is a potential cause of the abnormal state TempHigh1.)

The semantically enriched diagnosis model may be defined, e.g., by a rule in a form of (C1 isPotentialCauseOf A1). For example, the computing system may determine that HeatHigh1 (i.e., an heating system state that is higher than a threshold, etc.) is a potential cause of an abnormality TempHigh1 (i.e., a room temperature state higher than a threshold, etc.). In order to parameterize the diagnosis model 745, the computing system identifies the abnormal states TempHigh1 and HeatHigh1 in the historical or real-time time series data of the sensors TempSensor1 and Heating-Valve1, e.g., by using a known statistical or data mining technique. The parameterized diagnosis model may use data accessible and retrievable in a knowledge base in order to improve an accuracy of the parameterized diagnosis model. In the above example, both states TempHigh1 and HeatHigh1 are instances of a semantic concept "high". In one embodiment, the computing system can, therefore, determine that values of the real-time sensor data are statistically higher than an average room temperature and/or an average of heating values from a heating system. The computing system parameterizes a statistical classification technique and/or a mathematical technique in order to determine whether a room temperature is higher than the average room temperature as well as to determine whether a heating system is higher than average in such a situation. The computing system may compute the mean and standard deviation of the historical time series data from sensors TempSensor1 and HeatingValve1 in order to determine the average room temperature and heating system value and to further determine whether the current room temperature and heating system value is abnormal, for example, higher than the computed mean. The computed mean and standard deviation may be used in the parameterized diagnosis model as its parameters. A computing system or user may use the parameterized diagnosis model in order to determine one or more potential cause or actual cause of an abnormal condition of an entity or a system.

Figure 1:
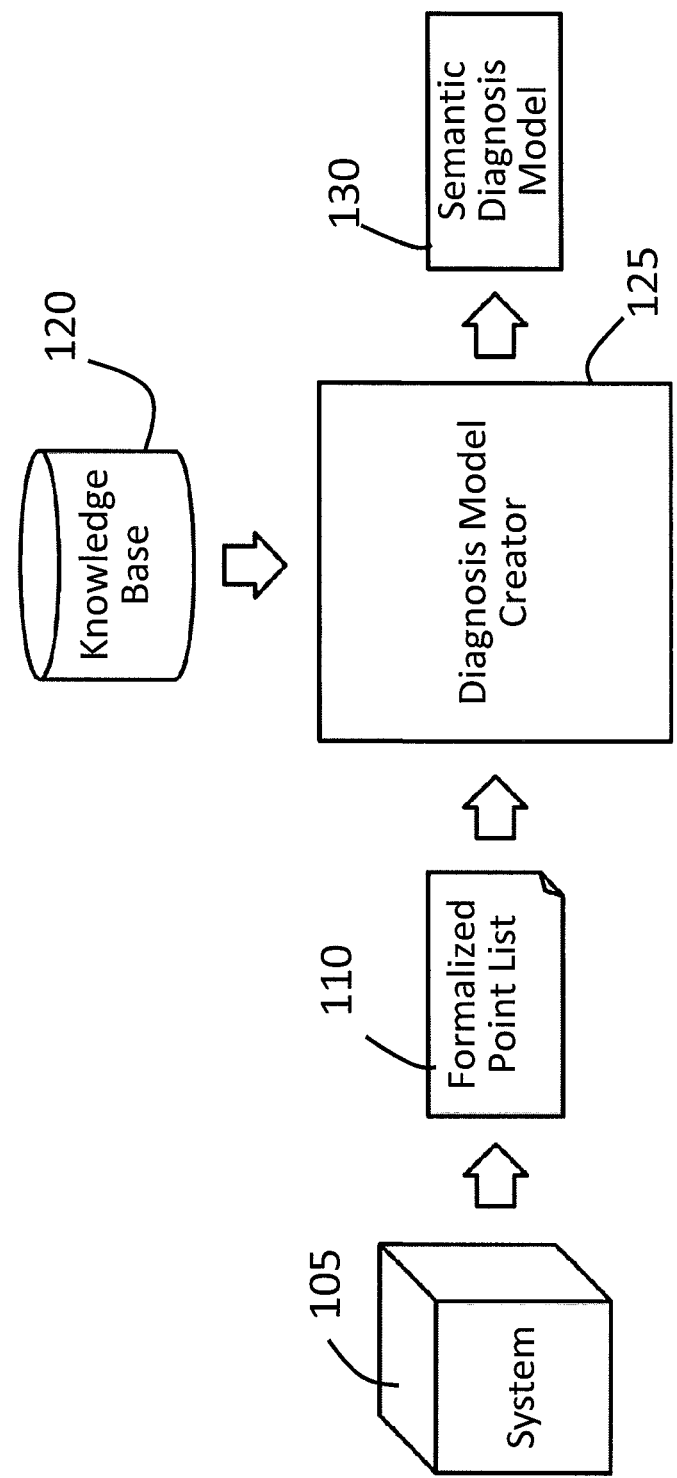
FIG. 1 illustrates a method for automatically creating a diagnosis model in one embodiment.

FIG. 1 illustrates a flowchart that describes method steps for automatically deriving the semantically-enriched diagnosis model from a list of data points in one embodiment. A system 105, i.e., the entity, provides data points 110 to the computing system as inputs. The computing system creates a semantic diagnosis model 130. The computing system further receives data from a knowledge base 120 and runs a diagnosis model creator 125 that finds a data model that maps the received inputs and the received knowledge base data and data representing the abnormal condition(s) of the entity.

Figure 2:
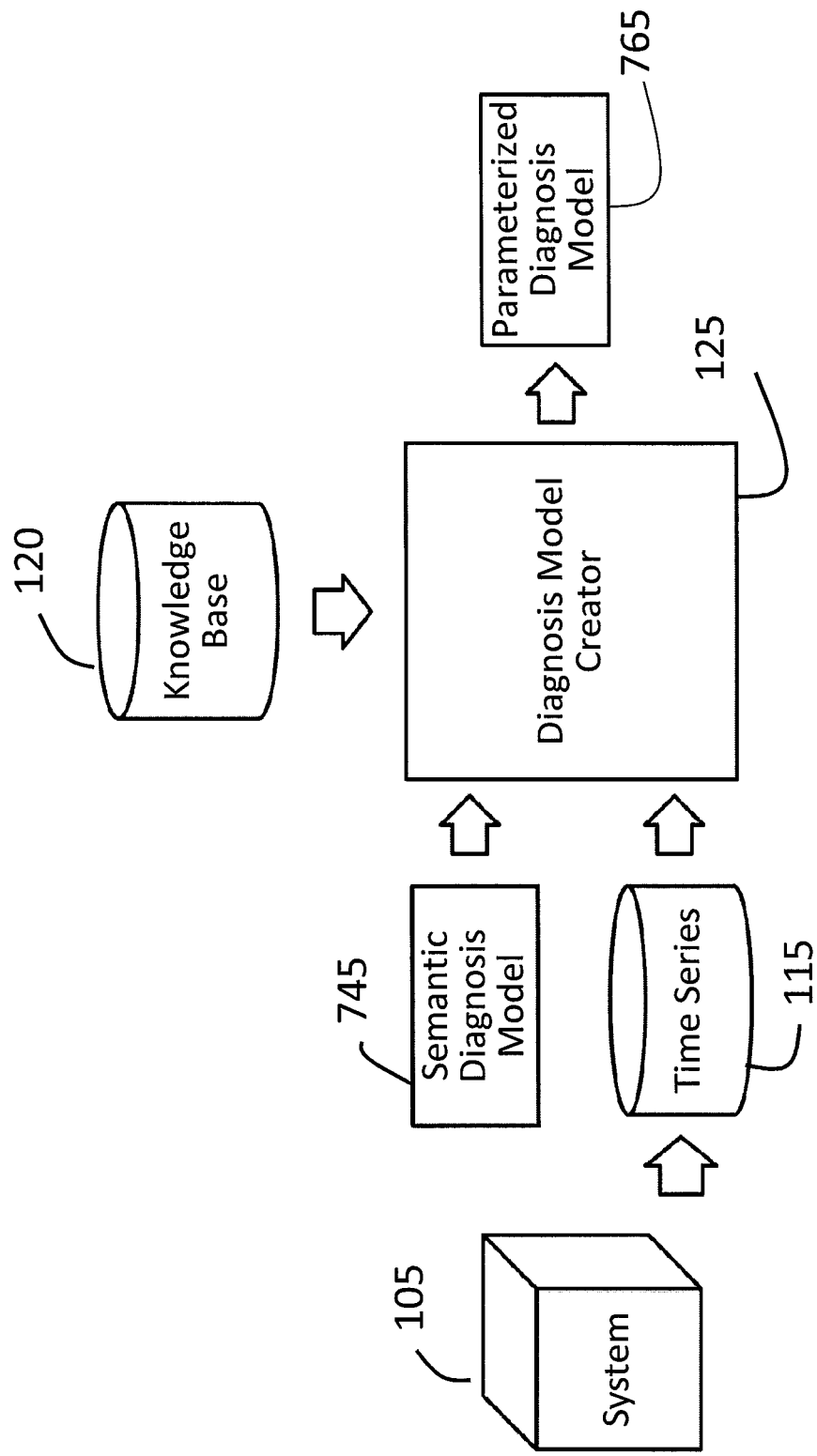
FIG. 2 illustrates a method for automatically creating a parameterized diagnosis model in one embodiment.

FIG. 2 illustrates a flowchart that describes method steps for automatically deriving the parameterized semantically-enriched diagnosis model from semantically-enriched diagnosis model and time series information in one embodiment. A system 105, i.e., the entity, provides the received data from the knowledge base 120 and/or time series data 115 and the data model, e.g., the semantic diagnosis model 745, to the diagnosis model creator 125 as inputs. The diagnosis model creator 125 creates the parameterized semantic diagnosis model 765, e.g., by analyzing the time series data 115 and/or the received data and/or the data model by using statistical or data mining techniques.

In one embodiment, the method shown in FIGS. 1-2 and 7 and the diagnosis model creator 125 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIGS. 10-11 may be implemented on a semiconductor chip, e.g., ASIC (Application-Specific Integrated Circuit), by using a semi custom design methodology, i.e., designing a semiconductor chip using standard cells and a hardware description language.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatically generating a semantic diagnosis model from a list of data points, the method comprising:
   sensing, by using a network of sensors, a time series of temperatures of a room;
   receiving, by a computer system, the time series of temperatures from the network of sensors, to be used to create a semantic diagnosis model;
   automatically creating, by the computer system, the semantic diagnosis model based on the received time series of temperatures, the automatically created diagnosis model reflecting rules that determine one or more potential causes of one or more abnormalities associated with one or more conditions in the room, including creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model;
   determining, by the computer system and based on the received time series of temperatures, that the room has an abnormal temperature; and
   determining, by the computer system using the diagnosis model and said rules, one or more potential causes of the abnormal temperature, including mapping one of the created variables to said abnormal temperature, said one of the created variables being positively correlated in the diagnosis model with said abnormal temperature.

2. The method according to claim 1, further comprising:
   semantically annotating the time series of temperatures from the network of sensors.

3. The method according to claim 1, wherein the creating variables representing physical conditions includes:
   automatically creating semantic variables having values that represent conditions in the room.

4. The method according to claim 1, further comprising:
   automatically deriving relationships between the variables.

5. The method according to claim 3, wherein the creating variables representing physical conditions includes:
   creating semantic variables that represent normal and abnormal conditions of the room, the created diagnosis model computing the rules based on the created semantic variables.

6. The method according to claim 1, further comprising:
   determining a relationship between the created variables and a dependency of the one or more potential causes of the one or more abnormalities associated with the one or more conditions.

7. The method of claim 1, further comprising:
   providing and using a database that stores a plurality of pre-determined semantic concepts and rules.

8. A method for automatically creating a parameterized, semantic diagnosis model, the method comprising:
   sensing, by using a network of sensors, a real-time series of temperatures of a room;
   receiving, by a computer system, the real-time time series of temperatures, from the network of sensors, associated with a diagnosis model;
   creating, by the computer system, based on the received time series of temperatures, the semantic diagnosis model, including
      creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model, parameterizing the diagnosis model, the parameterized diagnosis model mapping one or more potential causes or actual causes to a condition of the room and enabling, based on the mapping, a user or system to identify the one or more potential causes or the actual causes of the condition of the room;

determining, by the computer system and based on the received time series of temperatures, that the room has an abnormal temperature; and determining, by the computer system using the diagnosis model and said rules, one or more potential causes of the abnormal temperature, including mapping one of the created variables to said abnormal temperature, said one of the created variables being positively correlated in the diagnosis model with said abnormal temperature.

9. The method according to claim 8, wherein the creating the diagnosis model further includes:

analyzing a real-time time series of temperatures to extract parameters of the diagnosis model using statistical or data mining.

10. An apparatus for automatically generating a semantic diagnosis model on a computer system from a list of data points, the apparatus comprising:

a memory device;
a processor coupled to the memory device,
wherein the processor is configured to perform:
  receiving a time series of temperatures, from a network of sensors in a room, to be used to create a semantic diagnosis model; and
  automatically creating the semantic diagnosis model on the computer system based on the received time series of temperatures, the automatically created diagnosis model reflecting rules that determine one or more potential causes of one or more abnormalities associated with one or more conditions in a system the room, including
    creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model;
    determining, based on the received time series of temperatures, that the room has an abnormal temperature; and
    determining, by using the diagnosis model and said rules, one or more potential causes of the abnormal temperature, including mapping one of the created variables to said abnormal temperature, said one of the created variables being positively correlated in the diagnosis model with said abnormal temperature.

11. The apparatus according to claim 10, wherein the processor is configured to perform:

automatically creating semantic variables having values that represent conditions in the room.

12. The apparatus according to claim 10, wherein the processor is configured to perform:

automatically deriving relationships between the variables.

13. The apparatus according to claim 10, wherein the processor is configured to perform:

creating semantic variables that represent normal and abnormal conditions of the room, the created diagnosis model computing the rules based on the created semantic variables.

14. The apparatus according to claim 10, wherein the processor is configured to perform:

determining a relationship between the created semantic variables and a dependency of the one or more potential causes of the one or more abnormalities associated with the one or more conditions.

15. The apparatus of claim 10, wherein the processor is configured to perform:

providing and using a database that stores a plurality of pre-determined semantic concepts and rules.

16. An apparatus for automatically creating a parameterized, semantic diagnosis model on a computer system, the apparatus comprising:

a memory device;
a processor coupled to the memory device,
wherein the processor is configured to perform:
  receiving a real-time time series of temperatures, from a network of sensors in a room, associated with a semantic diagnosis model;
  creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model,
  parameterizing the diagnosis model, the parameterized diagnosis model mapping one or more potential causes or actual causes to a condition of the room and enabling, based on the mapping, a user or system to identify the one or more potential causes or the actual causes of the condition of the room;
  determining, based on the received time series of temperatures, that the room has an abnormal temperature; and
  determining, by using the diagnosis model and said rules, one or more potential causes of the abnormal temperature, including mapping one of the created variables to said abnormal temperature, said one of the created variables being positively correlated in the diagnosis model with said abnormal temperature.

17. The apparatus according to claim 16, wherein the parameterizing the diagnosis model includes:

analyzing a real-time time series of temperatures to extract parameters of the diagnosis model using statistical or data mining.

18. A computer program product for automatically generating a semantic diagnosis model on a computer system from a list of data points, the computer program product comprising a storage medium that excludes a propagating signal, the storage medium readable by a processing circuit and storing instructions run by the processing circuit for performing a method, said method steps comprising:

receiving, by a computer system, a time series of temperatures, from a network of sensors in a room, to be used to create a semantic diagnosis model;

automatically creating, by the computer system, the semantic diagnosis model based on the received time series of temperatures, the automatically created diagnosis model reflecting rules that determine one or more potential causes of one or more abnormalities associated with one or more physical conditions in the room, including creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model;

determining, by the computer system and based on the received time series of temperatures, that the room has an abnormal temperature; and determining, by the computer system using the diagnosis model and said rules, one or more potential causes of the abnormal temperature, including mapping one of the created variables to said abnormal temperature, said one of the created variables being positively correlated in the diagnosis model with said abnormal temperature.

19. The computer program product according to claim 18, wherein the method steps further comprises:
semantically annotating the time series of temperatures from the network of sensors.

20. The computer program product according to claim 18, wherein the method steps further comprises:
automatically creating semantic variables having values that represent conditions in the room.

21. The computer program product according to claim 18, wherein the method steps further comprises:
automatically deriving relationships between the variables.

22. The computer program product according to claim 18, wherein the creating variables representing physical conditions includes:
creating semantic variables that represent normal and abnormal conditions of the room, the created diagnosis model computing the rules based on the created semantic variables.

23. The computer program product according to claim 18, wherein the method steps further includes:
determining a relationship between the created semantic variables and a dependency of the one or more potential causes of the one or more abnormalities associated with the one or more conditions.

24. The computer program product according to claim 18, further comprising:
providing and using a database that stores a plurality of pre-determined semantic concepts and the rules.

25. A computer program product for automatically creating a parameterized, semantic diagnosis model on a computer system, the computer program product comprising a storage medium that excludes a propagating signal, the storage medium readable by a processing circuit and storing instructions run by the processing circuit for performing a method, said method steps comprising:

receiving, by a computer system, a real-time time series of temperatures, from a network of sensors in a room, associated with a semantic diagnosis model;

creating, by the computer system, based on the received real-time series of temperatures, the semantic diagnosis model on the computer system, including
creating a plurality of models in sequence including said semantic diagnosis model, including creating a semantic data point model comprising the time series of temperatures semantically annotated, creating variables representing physical conditions indicated by the semantically annotated temperatures, generating from the semantic data point model and the created variables a semantic variable model comprising a data representation of the created variables, and using the semantic variable model in the creating said diagnosis model, parameterizing the diagnosis model, the parameterized diagnosis model mapping one or more potential causes or actual causes to a condition of the room and enabling, based on the mapping, a user or system to identify the one or more potential causes or the actual causes of the condition of the room;

determining, by the computer system and based on the received time series of temperatures, that the room has an abnormal temperature; and determining, by the computer system using the diagnosis model and said rules, one or more potential causes of the abnormal temperature, including mapping one of the created variables to said abnormal temperature, said one of the created variables being positively correlated in the diagnosis model with said abnormal temperature.

26. The computer program product according to claim 24, wherein the creating the semantic diagnosis model further includes:
analyzing a real-time time series of temperatures to extract parameters of the diagnosis model using statistical or data mining.

27. The method according to claim 1, further comprising using the semantic diagnosis model to map one of the potential causes to one of the conditions in the system.

* * * * *